W. N. BRATT,
SEMAPHORE CHART,
APPLICATION FILED JAN. 23, 1917.
1,246,708.
Patented Nov. 13, 1917.
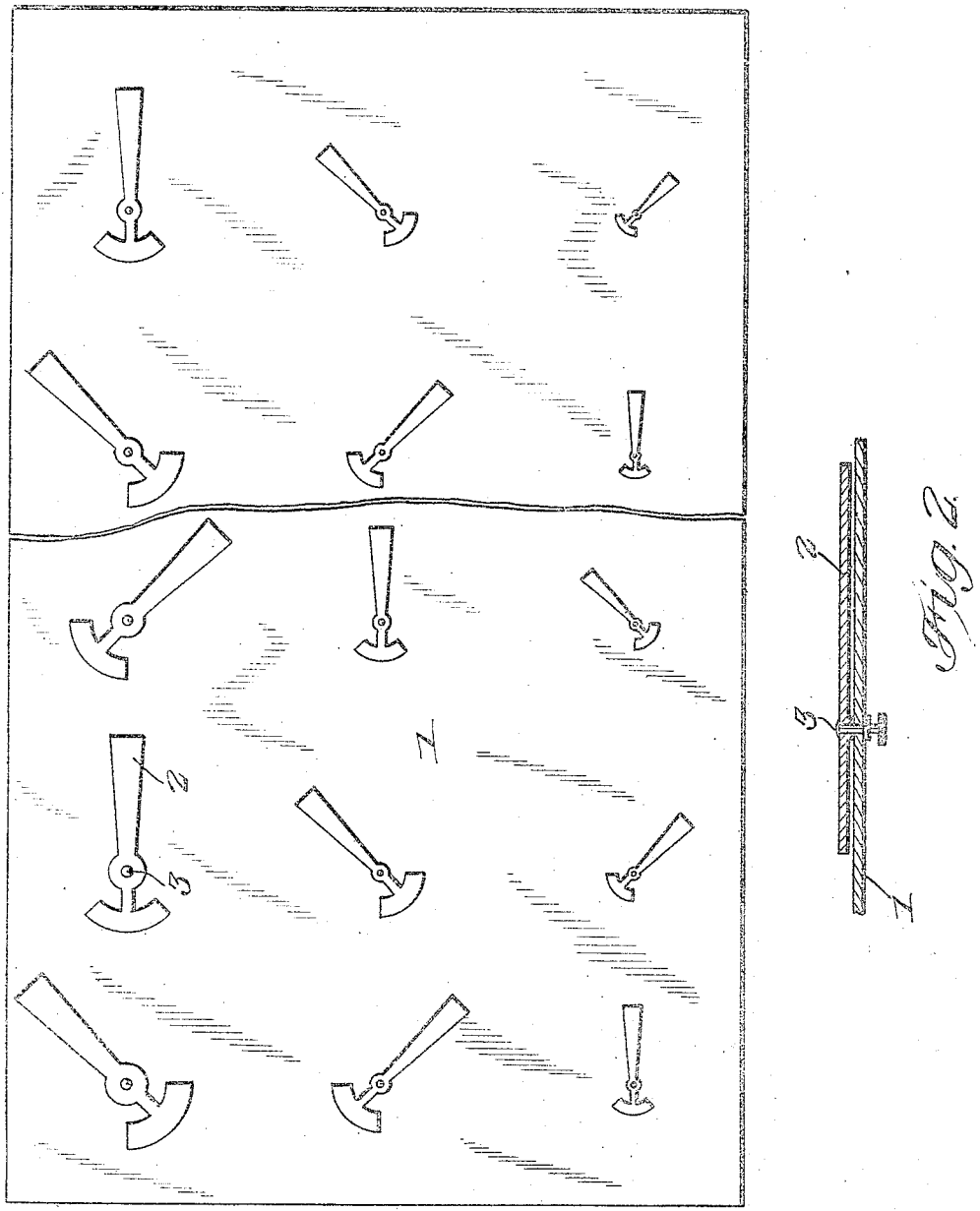

UNITED STATES PATENT OFFICE.

WILLIAM N. BRATT, OF WASHINGTON, ILLINOIS.

SEMAPHORE-CHART.

1,246,708.  Specification of Letters Patent.  Patented Nov. 13, 1917.

Application filed January 23, 1917. Serial No. 143,985.

*To all whom it may concern:*

Be it known that I, WILLIAM N. BRATT, a citizen of the United States, residing at Washington, in the county of Tazewell and State of Illinois, have invented new and useful Improvements in Semaphore-Charts, of which the following is a specification.

This invention relates to a chart or instrument for testing the vision of railway men, and it has for its primary object to provide a device, the viewed objects of which being in the form of semaphore blades arranged in a plurality of positions and diminishing in size in one direction.

An object of the invention is to provide a testing device including movable semaphore blades capable of being arranged in a plurality of positions so as to change the combination with the result that a new combination can be produced each time an individual is tested.

With these and other objects in view the invention will be better understood from the following detailed description taken in connection with the accompanying drawing, wherein—

Figure 1 is a plan view of the chart, and
Fig. 2 is a fragmentary sectional view.

I have found out by experience that when charts are used having stationary objects, a previous tested individual may communicate valuable information to an individual to be tested, and the purpose of this invention is to overcome this defect by making the viewed objects movable so that the combined positions of all the viewed objects may be changed each time the eyes of an individual are tested. It has been proven in practice that when a large number of semaphore blades are arranged adjacent each other such as at a station terminal, each blade interferes with the distinctness of an adjacent blade, and another object of my invention is to provide a chart with a number of movable semaphore blades capable of being changed from one position to the other so as to accurately test the eyes of an observer.

In the drawing, the numeral 1 designates a sheet having arranged thereon a plurality of semaphore blades 2 diminishing in size in a forward direction. Each blade 2 is mounted upon a pin 3 supported by the sheet.

At this point I wish to call attention to the fact that although the blades are shown mounted so as to be moved manually, I wish it to be understood that the pins may be so connected that a single device may be capable of simultaneously moving all of the blades for obtaining a different combination.

From the foregoing description it should be apparent that I provide a device which is admirably adapted for the purpose for which it is intended, that the device is simple, durable, and may be manufactured and sold at a comparatively low cost.

What I claim is:—

1. A chart comprising a sheet, and a plurality of movable semaphore blades diminishing in size in one direction and adapted to be moved so as to assume different combinations of positions.

2. A chart comprising a sheet, and a plurality of movable semaphore blades of different sizes adapted to be moved so as to assume different combinations of positions.

In testimony whereof I affix my signature.

WILLIAM N. BRATT.

Copies of this patent may be obtained for five cents each, by addressing the "Commissioner of Patents, Washington, D. C."